May 7, 1929. W. A. BURGER ET AL 1,712,196
SCREW DRIVER ATTACHMENT
Filed Nov. 14, 1927
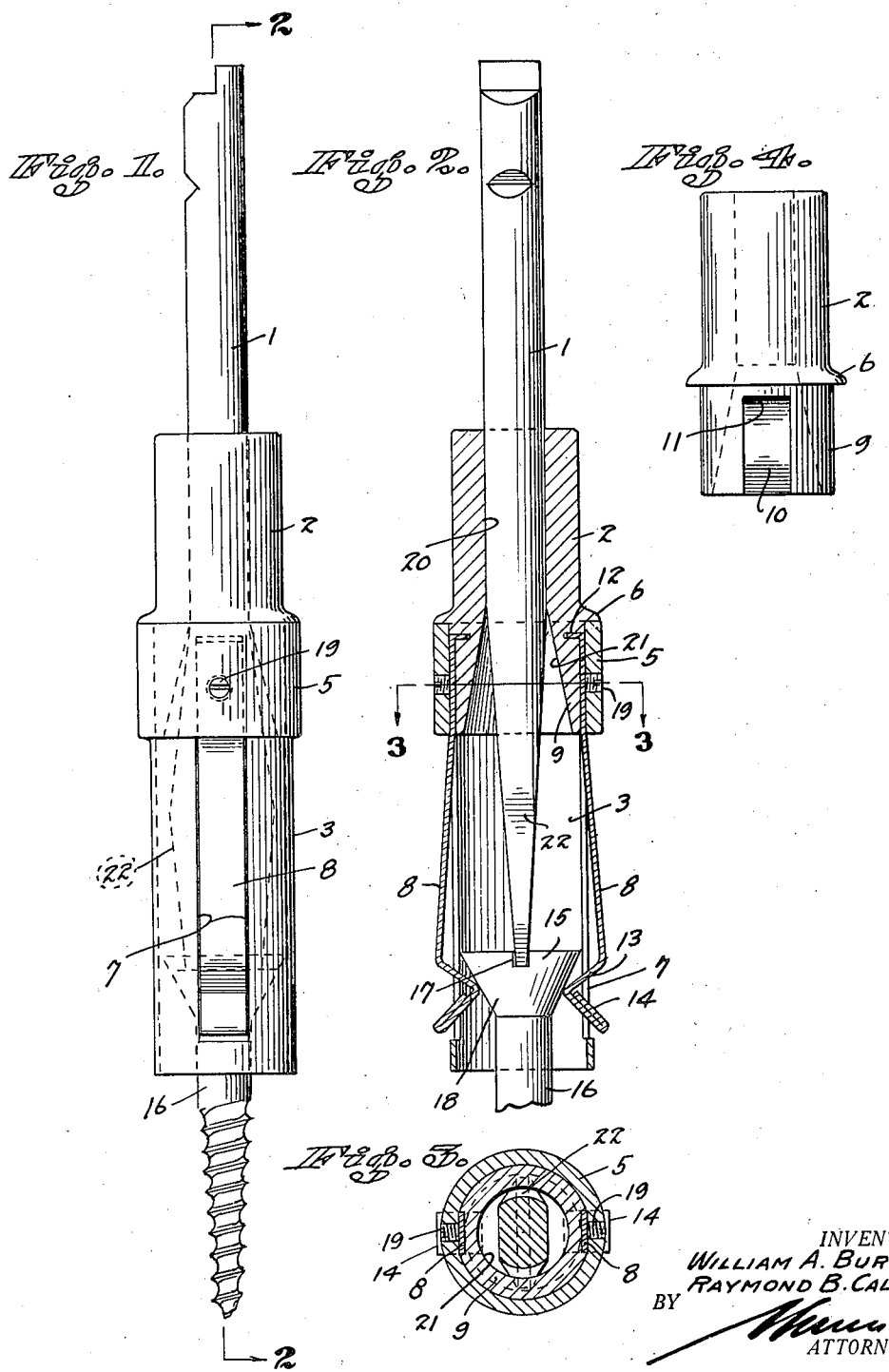
INVENTORS
WILLIAM A. BURGER
RAYMOND B. CALLAHAN
BY
ATTORNEYS.

Patented May 7, 1929.

1,712,196

UNITED STATES PATENT OFFICE.

WILLIAM A. BURGER, OF BERKELEY, AND RAYMOND B. CALLAHAN, OF OAKLAND, CALIFORNIA.

SCREW-DRIVER ATTACHMENT.

Application filed November 14, 1927. Serial No. 233,220.

Our invention relates to improvements in screw driver attachments, and it consists in the combinations, constructions, and arrangements hereinafter described and claimed.

An object of our invention is to provide a screw driver attachment used for preventing slippage between the screw driver and the screw, this attachment automatically giving way and freeing the screw from the device as the screw is driven home.

A further object of our invention is to provide a device of the type described which is extremely simple in construction, and which may be readily applied to any standard screw driver.

Other objects and advantages will appear in the following specification, and the novel features of our invention will be particularly pointed out in the appended claims.

Our invention is illustrated in the accompanying drawing forming a part of this application, in which:

Figure 1 is a side elevation of the device showing it operatively applied to a screw driver tool;

Figure 2 is a section along the line 2—2 of Figure 1;

Figure 3 is a section along the line 3—3 of Figure 2; and

Figure 4 is a side elevation of a part of the attachment.

In carrying out our invention we make use of a tool 1, of a screw driver. The attachment comprises two sleeves 2 and 3. The sleeve 2 has a reduced portion 9 for receiving the sleeve 3, and the sleeve 3 is provided with an enlarged portion 5 that may be disposed upon the reduced portion 9. A shoulder 6 fashioned on the sleeve 2 acts as a stop for the portion 5.

The sleeve 3 is provided with slots 7 in which springs 8 of the shape shown in Figure 2 are mounted. These springs extend up between the portion 5 and a depending portion 9 of the sleeve 2, see Figure 4. The portion 9 is recessed at 10 for receiving the springs and this recess extends inwardly at 11 for receiving the inwardly turned ends 12 of the springs 8.

The lower ends of the springs 8 are provided with hook-shaped ends 13 and the springs are doubled back upon themselves at 14 as a means of reinforcement.

From the foregoing description of the various parts of the device, the operation thereof may be readily understood.

The sleeve 2 is slidable upon the tool 1 and may be advanced so that the sleeve 3 will receive the head 15 of a screw 16. The kerf 17 in the head 15 receives the end of the screw driver tool 1. The screw is held within the sleeve 3 by the hook-shaped ends 13 contacting with the conical-shaped portion 17 of the head.

The screw driver is rotated in the usual manner for driving home the screw. The sleeve 3 houses the head of the screw until the sleeve abuts the surface of the article receiving the screw. After this takes place further advancement of the screw into the work will cause the sleeve 2 to slide back upon the tool 1 until the sleeve 3 moves clear of the head 15. It will be seen from this construction that the device is practically automatic in operation and provides a simple mechanism for preventing the screw driver from slipping off from the screw and marring the work.

The springs 8 are secured in place by set screws 19.

It will be noted from Figure 1 that the bore 20 of the sleeve 2 is enlarged as at 21, but the blade 22 shown by the dotted lines in Figure 1 is large enough to prevent the sleeve from slipping off from the tool.

Although we have shown and described one embodiment of our invention, it is to be understood that the same is susceptible of various changes and we reserve the right to employ such changes as may come within the scope of the appended claims.

We claim:

1. A screw driver attachment comprising two telescoping members, one of said members having spring recesses therein, springs receivable in said recesses, the other member clamping the springs in place, and acting as a guide for the free ends of the springs and for a screw.

2. A screw driver attachment comprising two telescoping members, one of said members having spring recesses therein, springs receivable in said recesses, the other member clamping the springs in place, said second member being hollow for receiving the head of a screw, and having slots therein for guiding the free ends of the springs into contact with said screw.

WILLIAM A. BURGER.
RAYMOND B. CALLAHAN.